United States Patent
Murphy et al.

(10) Patent No.: US 9,170,693 B2
(45) Date of Patent: Oct. 27, 2015

(54) CAPACITIVE TOUCH SYSTEM AND GAIN CONTROL METHOD THEREOF

(71) Applicant: PIXART IMAGING INC., Hsin-Chu County (TW)

(72) Inventors: Tom Murphy, Santa Clara, CA (US); Hsin-Chia Chen, Santa Clara, CA (US); William Han, Santa Clara, CA (US); Raman Sahgal, Santa Clara, CA (US)

(73) Assignee: Pixart Imaging Inc., Hsin-Chu County (TW)

( * ) Notice: Subject to any disclaimer, the term of this patent is extended or adjusted under 35 U.S.C. 154(b) by 217 days.

(21) Appl. No.: 14/085,934

(22) Filed: Nov. 21, 2013

(65) Prior Publication Data

US 2015/0138130 A1    May 21, 2015

(51) Int. Cl.
  *G06F 3/044* (2006.01)
  *G06F 3/041* (2006.01)

(52) U.S. Cl.
  CPC ............. *G06F 3/044* (2013.01); *G06F 3/0416* (2013.01)

(58) Field of Classification Search
  None
  See application file for complete search history.

(56) References Cited

U.S. PATENT DOCUMENTS

| | | | | |
|---|---|---|---|---|
| 6,460,005 B1 * | 10/2002 | Chang | ................. | G06F 11/3058 702/130 |
| 6,990,435 B2 * | 1/2006 | Kaneko | ................... | G01L 1/205 340/665 |
| 7,692,638 B2 * | 4/2010 | Land | ..................... | G06F 3/0418 178/18.01 |
| 8,094,128 B2 * | 1/2012 | Vu | ....................... | G06F 3/03545 178/18.01 |
| 2004/0071236 A1 * | 4/2004 | Dhalla | ................. | H03G 3/3089 375/345 |
| 2008/0048997 A1 * | 2/2008 | Gillespie | ............ | G06F 3/03547 345/174 |
| 2008/0252613 A1 * | 10/2008 | Chuang | ................... | G06F 3/041 345/174 |
| 2010/0299380 A1 * | 11/2010 | Warrington | ............ | H03G 3/002 708/290 |
| 2011/0241907 A1 * | 10/2011 | Cordeiro | ............... | G06F 3/0418 341/20 |
| 2012/0013399 A1 * | 1/2012 | Huang | ................. | H03G 3/3052 330/96 |
| 2012/0056841 A1 * | 3/2012 | Krenik | .................... | G06F 3/044 345/174 |
| 2012/0256868 A1 * | 10/2012 | Choi | ....................... | G06F 3/044 345/174 |
| 2012/0293446 A1 | 11/2012 | Crandall et al. | | |
| 2013/0127756 A1 * | 5/2013 | Wang | .................... | G06F 3/0488 345/173 |
| 2015/0049056 A1 * | 2/2015 | Post | ........................ | G06F 3/046 345/174 |

* cited by examiner

*Primary Examiner* — Antonio Xavier
(74) *Attorney, Agent, or Firm* — Rosenberg, Klein & Lee

(57) ABSTRACT

There is provided a capacitive touch system including a gain control unit sequentially receiving a plurality of digital detected signals of a detection frame. The gain control unit includes a gain buffer and a control circuit. The gain buffer is configured to store a current gain sheet. The control circuit calculates a first gain sheet according to a setpoint and the digital detected signals of the detection frame, compares a current roughness of the current gain sheet with a first roughness of the first gain sheet and replaces the current gain sheet in the gain buffer by the first gain sheet when the first roughness is flatter than the current roughness.

20 Claims, 4 Drawing Sheets

CAPACITIVE TOUCH SYSTEM AND GAIN CONTROL METHOD THEREOF

BACKGROUND

1. Field of the Disclosure

This disclosure generally relates to an input system and, more particularly, to a capacitive touch system and a gain control method thereof.

2. Description of the Related Art

The capacitive touch system generally includes a touch panel configured to detect the approaching or touching of at least one conductor. The touch panel includes a plurality of sensing cells configured to sense the capacitance variation induced by the conductor and to output varying detected signals.

The detected signals outputted by the sensing cells are sequentially amplified and filtered by an analog front end and then inputted into a digital back end. The digital back end generally includes a gain amplifier configured to keep each of the digitized detected signals at a substantially identical digital value when no touch event occurs. For example, a gain sheet may be previously set before shipment such that the digitized detected signals associated with every sensing cell may have substantially identical digital values in a non-touch state. However, the gain sheet is fixed and can not be changed according to the change of operation conditions, e.g. the operation temperature or aging, such that misidentification may occur during operation.

Accordingly, the present disclosure further provides a capacitive touch system and a gain control method thereof that may automatically update the gain sheet according to the roughness of touch data in actual operation so as to effectively improve the detection accuracy.

SUMMARY

The present disclosure provides a capacitive touch system and a gain control method thereof that may update the gain sheet directly according to the detected signals in operation such that the initialization configuration is no longer necessary.

The present disclosure further provides a capacitive touch system and a gain control method thereof that may select the gain sheet directly according to the detected signals in operation and may be adapted to the variation of the operation condition.

The present disclosure provides a capacitive touch system including a gain buffer, a multiplying circuit, a subtraction circuit and a control circuit. The gain buffer is configured to store a current gain sheet. The multiplying circuit is configured to multiply a digital detected signal associated with each sensing cell of a detection frame by an associated gain value in the current gain sheet to respectively output an amplified detected signal. The subtraction circuit is configured to subtract the amplified detected signal associated with each sensing cell of the detection frame from a setpoint to respectively output a first touch data. The control circuit is configured to calculate a first gain sheet associated with the detection frame, a current roughness of the current gain sheet and a first roughness of the first gain sheet, and to replace the current gain sheet in the gain buffer by the first gain sheet when the first roughness is smaller than the current roughness.

The present disclosure further provides a gain control method of a capacitive touch system including the steps of: receiving a plurality of digital detected signals of a first frame at a first time; calculating and storing a first gain sheet associated with the first frame and a first roughness of the first gain sheet; receiving a plurality of digital detected signals of a second frame at a second time; calculating a second gain sheet associated with the second frame and a second roughness of the second gain sheet; comparing, using a control circuit, the first roughness with the second roughness; and replacing the first gain sheet in a gain buffer by the second gain sheet when the second roughness is smaller than the first roughness.

The present disclosure further provides a capacitive touch system including a gain control unit sequentially receiving a plurality of digital detected signals of a detection frame. The gain control unit includes a gain buffer and a control circuit. The gain buffer is configured to store a current gain sheet. The control circuit is configured to calculate a first gain sheet according to a setpoint and the digital detected signals of the detection frame, compare a current roughness of the current gain sheet and a first roughness of the first gain sheet and replace the current gain sheet in the gain buffer by the first gain sheet when the first roughness is smaller than the current roughness.

In one aspect, the roughness may be a calculation result of at least two gain values within a predetermined range around each gain value in the gain sheet.

In one aspect, the control circuit may further calculate gain differences between corresponding gain values in a current gain sheet and a new gain sheet, and to replace the current gain sheet in the gain buffer by the new gain sheet when a count value of the gain differences larger than or equal to a difference threshold exceeds (larger than or equal to) a count threshold.

In one aspect, the control circuit preferably calculates the roughness of a new gain sheet once every a predetermined number of detection frames so as to confirm whether to update the current gain sheet in the gain buffer by the new gain sheet, wherein the predetermined number is preferably larger than 2.

In one aspect, the control circuit may calculate a new gain sheet according to digital detected signals and a setpoint, or calculate a new gain sheet according to a setpoint, current gain sheet and touch data, wherein the setpoint is for zeroing the touch data in a non-touch state.

In one aspect, when the drive frequency of the drive signal is changed, the control circuit may calculate a new gain sheet according to a setpoint and touch data associated with two detection frames respectively before and after the change of the drive frequency, wherein the setpoint is for zeroing the touch data in a non-touch state.

In the capacitive touch system and the gain control method according to the embodiment of the present disclosure, the object of automatically updating the gain sheet is achieved by calculating and recording a current gain sheet after the startup and wake-up of the system and continuously confirming whether the stored current gain sheet should be instantly updated during operation.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
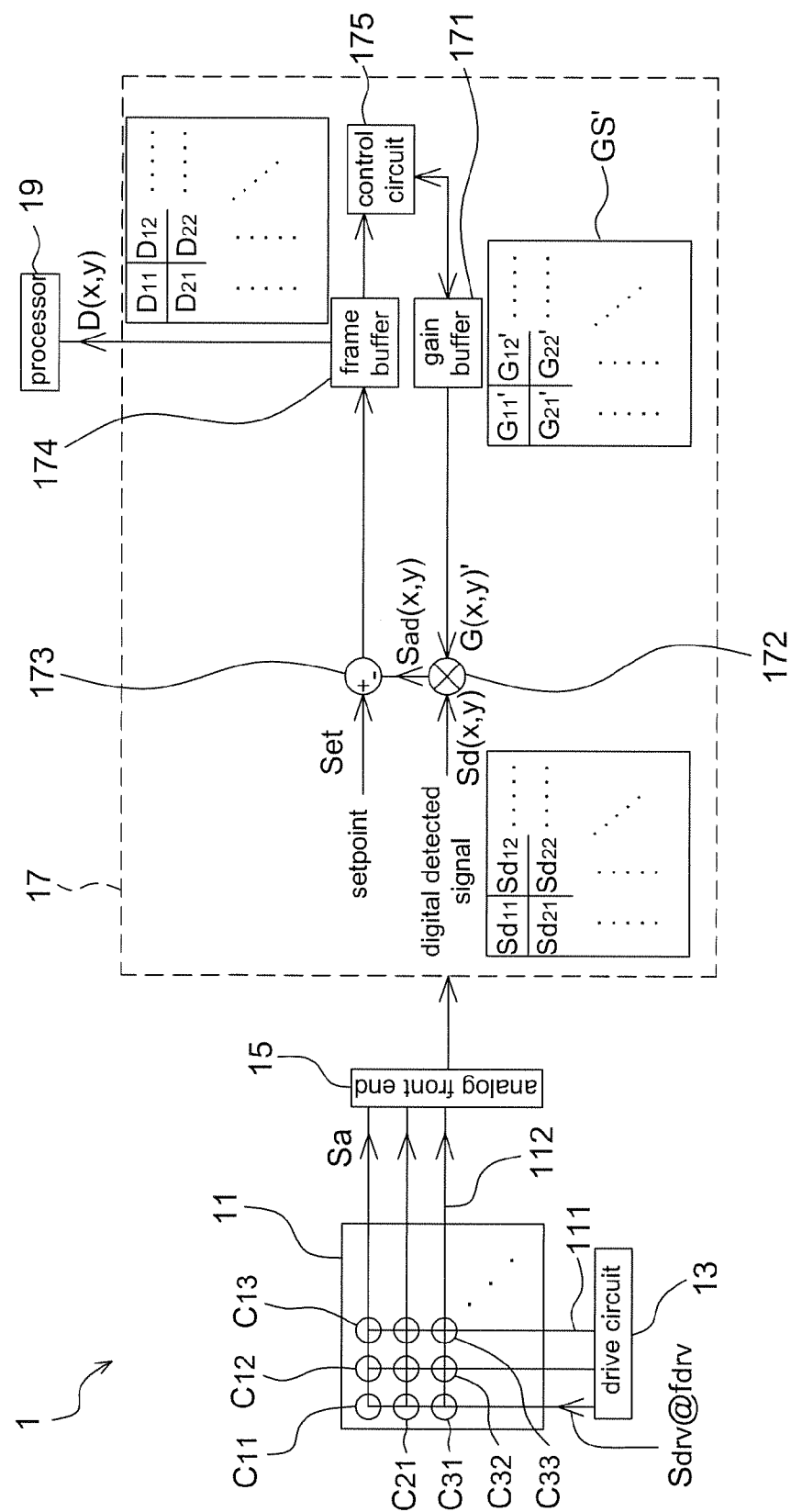
FIG. 1 shows a schematic block diagram of the capacitive touch system according to an embodiment of the present disclosure.

Referring to FIG. 1, it shows a schematic block diagram of the capacitive touch system according to an embodiment of the present disclosure. The capacitive touch system 1 of this embodiment includes a touch panel 11, a drive circuit 13, an analog front end 15, a gain control unit 17 and a processing unit 19, wherein the processing unit 19 may be a touch CPU configured to perform the object positioning according to a single frame of touch data D(x,y) and the object tracking according to a plurality of frames of touch data D(x,y) outputted by the gain control unit 17, wherein the method of performing the object positioning and/or tracking is not the object of the present disclosure and thus details thereof are not described herein.

The touch panel 11 may be a capacitive touch panel including a plurality of transversally or longitudinally arranged drive electrodes 111 and a plurality of sense electrodes 112 crossing over the drive electrodes 111 for forming the mutual capacitance therebetween, wherein the crossing points of the drive electrodes 111 and the sense electrodes 112 form the sensing cells, e.g. $C_{11}, C_{12}, C_{13}$ .... The number of the drive electrodes 111 and the sense electrodes 112 may be determined according to the panel size and panel resolution, and the method of forming the drive electrodes 111 and the sense electrodes 112 on a substrate is well known and thus details thereof are not described herein. In the capacitive touch panel, when a conductor (e.g. a finger) approaches or touches the touch panel 11, one or a plurality of sensing cells $C_{11}, C_{12}, C_{13}$ ... corresponding to a position of the conductor generate a capacitance change so as to influence the analog detected signal Sa outputted to the analog front end 15. The method of a capacitive touch panel sensing a conductor and outputting the analog detected signal Sa is well known and thus details thereof are not described herein.

The drive circuit 13 is coupled to the drive electrodes 111 and inputs a drive signal Sdrv having a fixed or an adjustable drive frequency fdrv to the drive electrodes 111 of the touch panel 11, wherein different drive frequencies are for denoising and the drive signal Sdrv may be a square wave, a sinusoidal wave or other time-varying signals. For example, when the drive circuit 13 drives a detection frame with a drive signal Sdrv having a first drive frequency fdrv1, if the analog front end 15 or a digital back end identifies that the SNR is not good enough, the drive circuit 13 may drive the followed detection frames with a drive signal Sdrv having a second drive frequency fdrv2 (e.g. referring to FIG. 4), wherein said detection frame in the present disclosure is referred to a time interval that each sensing cell $C_{11}, C_{12}, C_{13}$ ... of the touch panel 11 is driven by the drive circuit 13 and respectively outputs an analog detected signal Sa. For example, the drive circuit 13 may sequentially or simultaneously input the drive signal Sdrv to the drive electrodes 111 through a plurality of switching devices, and the analog front end 15 may sequentially read the analog detected signals Sa from the sense electrodes 112 through changing a plurality of switching devices.

The analog front end 15 is configured to amplify and filter the analog detected signals Sa outputted by the sensing cells $C_{11}, C_{12}, C_{13}$ and convert the analog detected signals Sa to digital detected signals Sd(x,y) using an analog-to-digital converter (ADC), wherein "x" and "y" of the digital detected signals Sd(x,y) are associated with the position of the sensing cells $C_{11}, C_{12}, C_{13}$ ... so as to represent each signal component of one detection frame, e.g. $Sd_{11}$ being associated with the sensing cell $C_{11}$, $Sd_{12}$ being associated with the sensing cell $C_{12}$ and so on. The bit number included in the digital detected signals Sd(x,y) may be determined according to different applications, e.g. 16 bits, but not limited to. The method of the analog front end 15 pre-processing the analog detected signals Sa so as to output the digital detected signals Sd(x,y) is not described in detail herein as long as the analog front end 15 may output the digital detected signals Sd(x,y) according to the analog detected signals Sa. The present disclosure is to adjust the stored gain sheet by the gain control unit 17 in a digital back end according to actually received digital detected signals Sd(x,y).

The gain control unit 17 sequentially receives a plurality of digital detected signals Sd(x,y) of a detection frame, and determines whether to update the stored gain sheet according to the digital detected signals Sd(x,y). In this embodiment, the gain control unit 17 includes a gain buffer 171, a multiplying circuit 172, a subtraction circuit 173, a frame buffer 174 and a control circuit 175. It should be mentioned that the digital detected signals Sd(x,y) may be digital signals amplified and filtered by other components of the digital back end, wherein the amplifying and filtering of digital signals are not the object of the present disclosure and thus details thereof are not described herein.

The gain buffer 171 is for storing a current gain sheet GS', wherein an initial value of the current gain sheet GS' may be obtained according to a first detection frame retrieved after the startup or wake-up of the capacitive touch system 1 (described later). Accordingly, before shipment it is not necessary to previously store a predetermined gain sheet in the capacitive touch system 1 of the present disclosure. The current gain sheet GS' may be automatically adjusted according to the followed detection frames of the capacitive touch system 1 so as to adapt to any change of the environmental condition. The current gain sheet GS' includes a plurality of gain values G(x,y)', e.g. $G_{11}', G_{12}', G_{13}'$ ...., for amplifying each of the digital detected signals Sd(x,y), and the number of the gain values G(x,y)' is preferably equal to that of the sensing cells $C_{11}, C_{12}, C_{13}$ ... (i.e. the size of detection frame). Similarly, $G_{11}'$ is associated with the sensing cell $C_{11}$, $G_{12}'$ is associated with the sensing cell $C_{12}$ and so on.

After the current gain sheet GS' is obtained, the gain control unit 17 sequentially receives a plurality of digital detected signals $Sd_{11}, Sd_{12}$ ... of a followed detection frame, and the multiplying circuit 172 is configured to multiply the digital detected signals $Sd_{11}, Sd_{12}$ ... associated with each sensing cell in the detection frame by an associated gain value $G_{11}', G_{12}'$ ... in the current gain sheet GS' to respectively output an amplified detected signal Sad(x,y), e.g. $Sad_{11}=Sd_{11} \times G_{11}'$, $Sad_{12}=Sd_{12} \times G_{12}'$ .... Similarly, $Sd_{11}$ is associated with the sensing cell $C_{11}$, $Sd_{12}$ is associated with the sensing cell $C_{12}$ and so on.

Next, the subtracting circuit 173 is configured to subtract the amplified detected signals Sad(x,y) associated with each sensing cell in the detection frame from a setpoint Set to respectively output a first touch data D(x,y) for being stored in the frame buffer 174 such that the frame buffer 174 stores the first touch data $D_{11}$, $D_{12}$ ... corresponding to the detection frame. The processing unit 19 performs the object positioning and/or tracking according to the touch data $D(x,y)$. Similarly, $D_{11}$ is associated with the sensing cell $C_{11}$, $D_{12}$ is associated with the sensing cell $C_{12}$ and so on. In this embodiment, the setpoint Set may have a digital value 16384 and is configured to allow the first touch data $D(x,y)$ to be 0 when the touch panel 11 is in a non-touch state. When the touch panel 11 is in a touch state, the first touch data $D(x,y)$ is larger than 0, e.g. a digital value between 2000 and 5000, such that the touch position and position variation may be detected accordingly. It should be mentioned that the digital values mentioned above are only intended to illustrate but not to limit the present disclosure.

In this embodiment, the capacitive touch system 1 can not tell whether there is any conductor approaching or touching the touch panel 11 according to the detection frame firstly retrieved after the startup or wake-up. The control circuit 175 may calculate a first gain sheet GS (e.g. referring to FIG. 2A) associated with the followed detection frames and calculate a current roughness of the current gain sheet GS' (e.g. referring to FIG. 2A) and a first roughness of the first gain sheet GS. When the first roughness is smaller than the current roughness, the current gain sheet GS' stored in the gain buffer 171 is replaced by the first gain sheet GS.

Figures 2A, 2B:
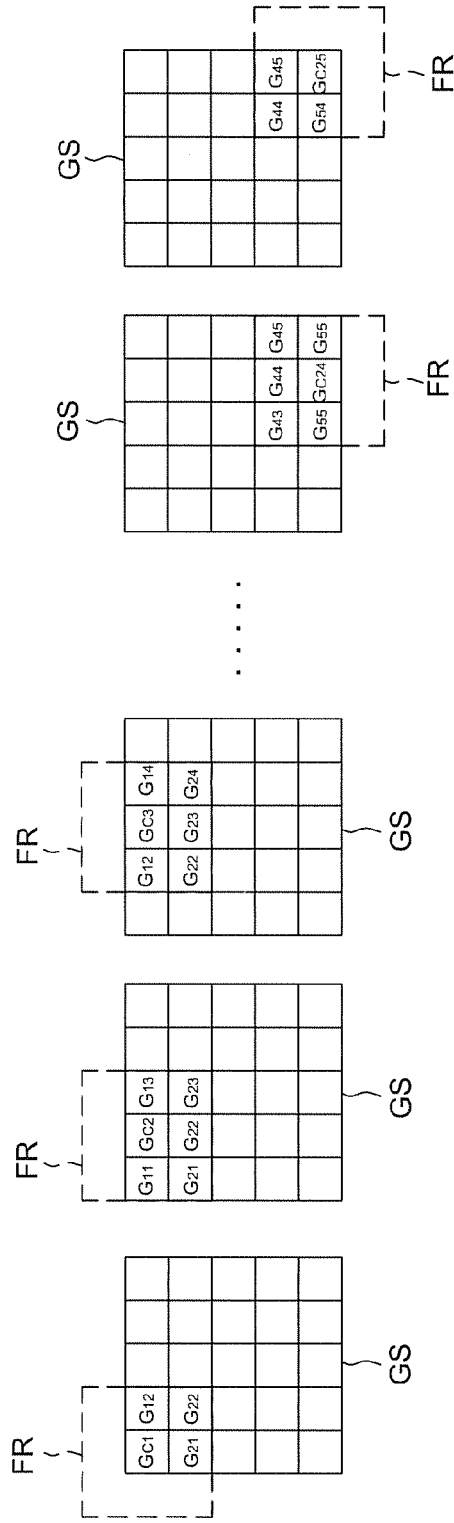
FIG. 2A shows a schematic diagram of the gain sheet in the capacitive touch system according to the embodiment of the present disclosure.
FIGS. 2B shows a schematic diagram of calculating the roughness of gain sheet in the capacitive touch system according to the embodiment of the present disclosure.

Referring to FIG. 2B, in the present disclosure the roughness may be defined as a calculation result of at least two gain values within a predetermined range around each gain value $G(x,y)$ in a gain sheet. For example, the roughness may be represented by equation (1), $$GR = \sum_{x,y} \text{filter}(x, y) \otimes G(x, y) \quad (1)$$

In one embodiment, the current roughness may be a sum of absolute differences between each gain value $G(x,y)'$ and at least one neighbor gain value within a predetermined range FR around the gain value $G(x,y)'$, and the first roughness may be a sum of absolute differences between each gain value $G(x,y)$ and at least one neighbor gain value within a predetermined range FR around the gain value $G(x,y)$. For example FIG. 2B explains the roughness by the first gain sheet GS, wherein the predetermined range FR herein has a size of 3×3 and the center of the predetermined range FR is indicated by $G_{c1}$-$G_{c25}$. The first roughness may be represented by $(|G_{c1}-G_{12}|+|G_{c1}-G_{21}|+|G_{c1}-G_{22}|)+(|G_{c2}-G_{11}|+|G_{c2}-G_{13}|+|G_{c2}-G_{21}|+|G_{c2}-G_{22}|+|G_{c2}-G_{23}|) \ldots +(|Gc_{24}-G_{43}|+|Gc_{24}-G_{44}|+|Gc_{24}-G_{45}|+|Gc_{24}-G_{53}|+|Gc_{24}-G_{55}|)+(|Gc_{25}-G_{44}|+|Gc_{25}-G_{44}|+|Gc_{25}-G_{45}|+|Gc_{25}-G_{54}|)$. It is appreciated that the covered gain values by the predetermined range FR and the size of the predetermined range FR shown in FIG. 2B are only intended to illustrate but not to limit the present disclosure. In addition, the roughness may be calculated by other methods, e.g. calculating a standard deviation of at least two gain values within the predetermined range FR, but not limited thereto.

When the first roughness is smaller than the current roughness, it means that the first gain sheet GS is closer to a non-touch state (i.e. the roughness is smaller in the non-touch state) and thus the control circuit 175 replaces the current gain sheet GS' in the gain buffer 171 by the first gain sheet GS. The first gain sheet GS is used to amplify the digital detected signal $Sd(x,y)$ in the followed detection frames till the first gain sheet GS is replaced. If the first roughness is larger than or equal to the current roughness, the control circuit 175 keeps on amplifying the digital detected signal $Sd(x,y)$ by the current gain sheet GS' in the followed detection frames till the current gain sheet GS' is replaced. In this embodiment, the control circuit 175 may calculate the roughness of a new gain sheet once every a predetermined time to be compared with the roughness stored in the gain buffer 171, the control circuit 175 or other storage units, and when a new gain sheet having lower roughness is obtained, the stored gain sheet is replaced.

By replacing the current stored gain sheet by a new gain sheet having smaller roughness may not be applied to all scenarios. For example, when the capacitive touch system 1 is put under water, the roughness may have a small value. Then if the capacitive touch system 1 is taken out from the water, the roughness becomes larger. In this case, the current stored gain sheet has to be replaced by a new gain sheet having larger roughness. Therefore, an additional identification condition may be used to deal with this kind of environmental change; that is, when the entire operation environment of the capacitive touch system 1 is changed, e.g. putting under or taken out from water, the roughness may have an obvious level shift, increment or decrement. Accordingly in this embodiment, the control circuit 175 may further calculate gain differences of corresponding gain values in the current gain sheet GS' and the first gain sheet GS, e.g. $(G_{11}'-G_{11})$, $(G_{12}'-G_{12})$ ... as shown in FIG. 2A. When a count value LSc of the gain differences larger than or equal to a difference threshold THds, e.g. shown by equation (2), is larger than a count threshold THc, the control circuit 175 replaces the current gain sheet GS' in the gain buffer 171 by the first gain sheet GS, wherein the count threshold THc may be set according to actual measurement, $$LSc = \sum_{x,y} f(G'(x, y) - G(x, y)), \text{ wherein } f(t) = \begin{cases} 1, |t| \geq THds \\ 0, \text{ others} \end{cases} \quad (2)$$

In one embodiment, the gain sheet may be calculated according to the digital detected signal $Sd(x,y)$ and the setpoint Set. For example in FIG. 1, each gain value $G(x,y)$ in the first gain sheet GS may be calculated by equation (3), $$G(x, y) = \frac{\text{Set} - D(x, y)}{Sd(x, y)} \quad (3)$$

In a non-touch state, each gain value $G(x,y)$ is selected to allow $D(x,y)$ in equal (3) to be zero such that each gain value $G(x,y)$ becomes a quotient of the setpoint Set divided by the digital detected signal $Sd(x,y)$. The control circuit 175 may calculate all gain values $G(x,y)$ associated with one detection frame using equation (3) by setting $D(x,y)=0$ so as to obtain the first gain sheet GS.

More specifically speaking, in this embodiment the control circuit 175 may calculate a first gain sheet GS and the current gain sheet GS' according to a setpoint Set and the digital detected signal $Sd(x,y)$ of a detection frame. The control circuit 175 then compares a current roughness of the current gain sheet GS' (stored in the gain buffer 171) with a first roughness of the first gain sheet GS. When the first roughness is smaller than the current roughness, the current gain sheet GS' in the gain buffer 171 is replaced by the first gain sheet GS.

In addition, the control circuit 175 further calculates a difference (e.g. performed by the subtraction circuit 173) between the setpoint Set and a product (e.g. performed by the multiplying circuit 172) of each of the digital detected signals Sd(x,y) in a detection frame and an associated gain value G(x,y)' in the current gain sheet GS' to respectively output a first touch data D(x,y).

In another embodiment, the first gain sheet GS may be calculated according to the setpoint Set, the current gain sheet GS' and the first touch data D(x,y). According to FIG. 1, it is known that Set-D(x,y)=G(x,y)'×Sd(x,y). As the purpose of updating the gain sheet is to allow D(x,y) to be zero, it is able to obtain Set=G(x,y)×Sd(x,y). Accordingly, an equation (4) is obtained according to these relationships, $$G(x, y) = \frac{G'(x, y) \times \text{Set}}{\text{Set} - D(x, y)} \quad (4)$$

The control circuit 175 may calculate all gain values G(x,y) associated with one detection frame using equation (4) so as to obtain the first gain sheet GS. In this embodiment, the current gain sheet GS' and the first gain sheet GS are both obtained when the drive circuit 13 drives at the same drive frequency fdrv.

In another embodiment, when the analog front end 15 or digital back end identifies that a better SNR can be obtained by altering the drive frequency fdrv, the first gain sheet GS may be obtained according to the setpoint Set and the touch data D(x,y) at different drive frequencies. For example, at a first drive frequency, the multiplying circuit 172 multiplies a digital detected signal associated with each sensing cell of a previous frame of a detection frame corresponding to the first drive frequency by an associated gain value G(x,y)' in the current gain sheet GS' to respectively output an amplified detected signal; the subtraction circuit 173 subtracts the amplified detected signal associated with each sensing cell of the previous frame from the setpoint Set to respectively output a previous touch data Dp(x,y), e.g. the D5(x,y) at time $t_P$ in FIG. 4. At a second drive frequency, the multiplying circuit 172 multiplies a digital detected signal associated with each sensing cell of the detection frame corresponding to the second drive frequency by an associated gain value G(x,y)' in the current gain sheet GS' to respectively output an amplified detected signal; the subtraction circuit 173 subtracts the amplified detected signal associated with each sensing cell of the detection frame from the setpoint Set to respectively output a first touch data D(x,y), e.g. the D6(x,y) at time $t_2$ in FIG. 4. At the first drive frequency, if the gain value G(x,y)' is assumed to be 1, Set-D(x,y)=1×Sd(x,y) can be obtained; it is further assumed that the touch data is maintained identical before and after the frequency change, i.e. D(x,y)=Dp(x,y), then Set-Dp(x,y)=G(x,y)×Sd(x,y)/shift can further be obtained. Accordingly, an equation (5) is obtained according to these relationships, $$G(x, y) = \frac{\text{shift} \times (\text{Set} - D(x, y))}{\text{Set} - Dp(x, y)} \quad (5)$$

The term "shift" in equation (5) is referred to a digital deviation which may be determined according to different applications without particular limitation. The control circuit 175 may calculate all gain values G(x,y) associated with one detection frame using equation (5) so as to obtain the first gain sheet GS.

In the above embodiments, the current gain sheet GS' is referred to the one currently stored in the gain buffer 171 and the first gain GS is referred to the one obtained according to a new retrieved detection frame.

Figure 4:
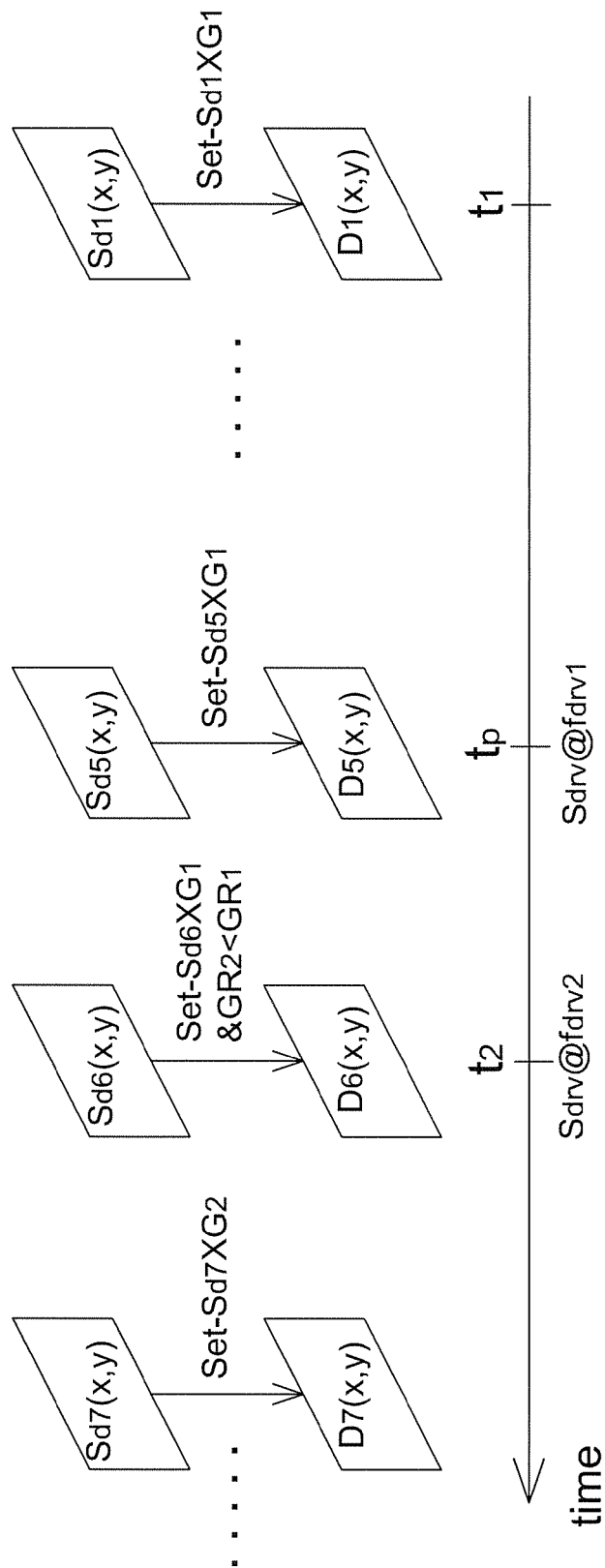
FIG. 4 shows an operational diagram of the gain control method of the capacitive touch system according to the embodiment of the present disclosure.

Referring to FIGS. 2A and 4, in the present disclosure the control circuit 175 preferably identifies whether the current gain sheet GS' stored in the gain buffer 171 has a lower roughness once every a predetermined number of detection frames so as to determine whether to update the gain sheet. For example FIG. 4 shows that the roughness GR2 of a new gain sheet G2 of a new detection frame is calculated once every 5 detection frames, wherein the roughness may be calculated according to the above methods. When the roughness GR2 of the new gain sheet G2 of the new detection frame is lower than the roughness GR1 of the current gain sheet G1 being stored, the current gain sheet G1 is replaced by the new gain sheet G2. It should be mentioned that the predetermined number is not limited to 5 and may be determined according to different requirements, e.g. preferably larger than 2.

Figure 3:
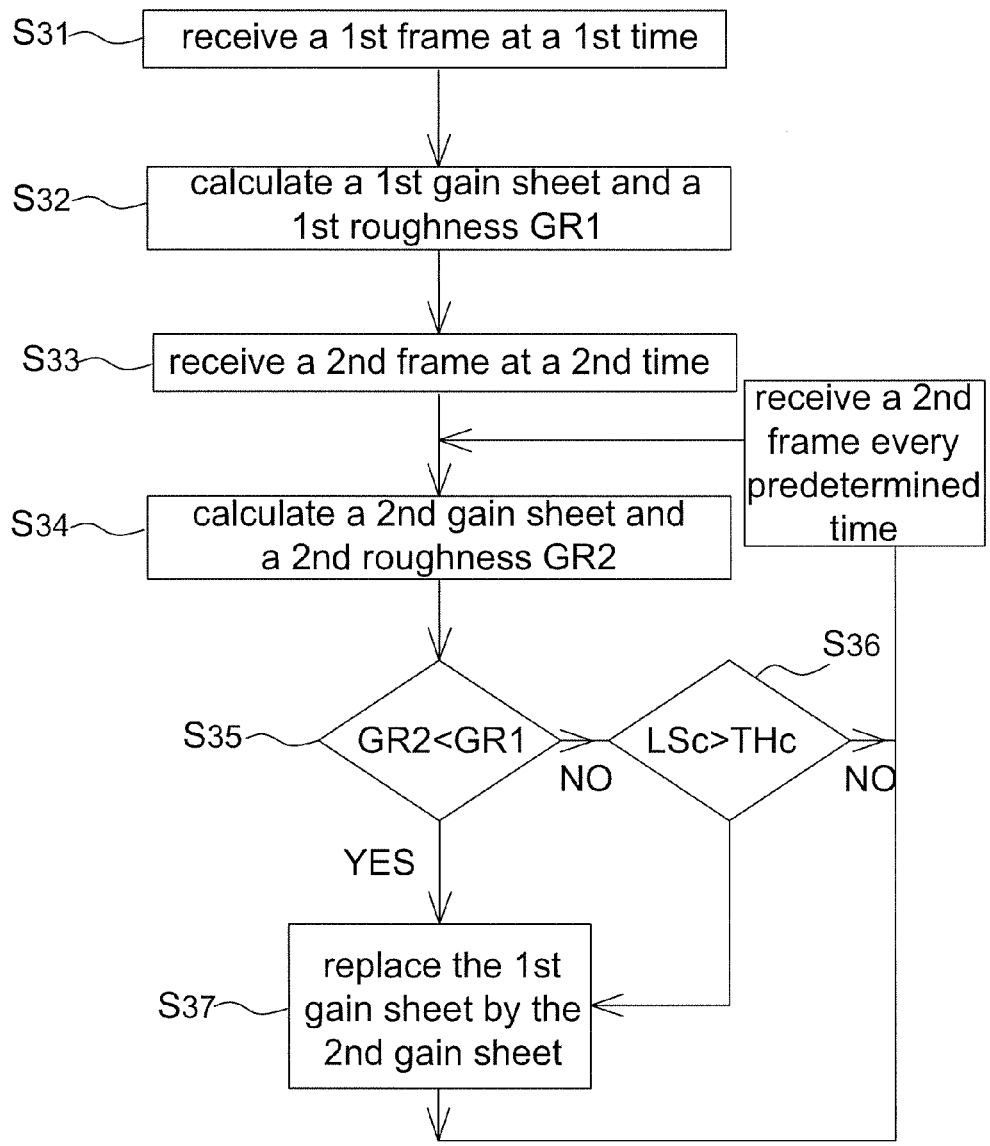
FIG. 3 shows a flow chart of the gain control method of the capacitive touch system according to the embodiment of the present disclosure.

Referring to FIG. 3, it shows a flow chart of the gain control method of a capacitive touch system according to an embodiment of the present disclosure, which includes the steps of: receiving a plurality of digital detected signals of a first frame at a first time (Step $S_{31}$); calculating and storing a first gain sheet associated with the first frame and a first roughness of the first gain sheet (Step $S_{32}$); receiving a plurality of digital detected signals of a second frame at a second time (Step $S_{33}$); calculating a second gain sheet associated with the second frame and a second roughness of the second gain sheet (Step $S_{34}$); comparing the first roughness and the second roughness using a control circuit (Step $S_{35}$); and replacing the first gain sheet in a gain buffer by the second gain sheet when the second roughness is smaller than the first roughness (Step $S_{37}$). This embodiment may further include an optional step: calculating, using the control circuit, gain differences between corresponding gain values in the first gain sheet and the second gain sheet and comparing a count value LSc of the gain differences larger than or equal to a difference threshold with a count threshold THc (Step $S_{36}$), wherein this step is to detect whether the operation environment of the capacitive touch system 1 has a significant change but this step may not be implemented according to different applications. In another embodiment, the first roughness may be calculated in the comparing step without being previously calculated and stored.

Referring to FIGS. 1-4, details of the gain control method according to the embodiment of the present disclosure are described hereinafter.

Step $S_{31}$: Firstly, the gain control unit 17 sequentially receives a plurality of digital detected signals Sd1(x,y) of a first frame at first time $t_1$ (as FIG. 4), wherein the digital detected signals Sd1(x,y) are respectively associated with detected results of the sensing cells $C_{11}, C_{12}, C_{13} \ldots$ of the touch panel 11 at time $t_3$, and the outputted digital detected signals Sd1(x,y) are associated with the sensing cells $C_{11}, C_{12}, C_{13} \ldots$ according to the sequence of the drive electrodes 111 receiving the drive signal Sdrv and the sense electrodes 112 outputting the analog detected signals Sa (i.e. the scan sequence). In one embodiment, the first time $t_1$ may be a first detection frame retrieved after the startup or wake-up.

Step $S_{32}$: The control circuit 175 may calculate and store a first gain sheet G1 and a first roughness GR1 of the first gain sheet G1 according to the above methods, wherein the first roughness GR1 may be stored in the gain buffer 171, the control circuit 175 or other registers. As mentioned above the first roughness GR1 may not be calculated and saved in this step. For example, the control circuit 175 may calculate the first gain sheet G1 according to the digital detected signals Sd1(x,y) of the first frame and a setpoint Set, referring to equation (3). For example, the control circuit 175 may take a calculation result of at least two gain values within a predetermined range FR around each gain value in the first gain sheet G1 as the first roughness GR1, referring to equation (1) and FIG. 2B.

Step $S_{33}$: Next, the gain control unit 17 sequentially receives a plurality of digital detected signals Sd6(x,y) of a second frame at a time $t_2$ (as FIG. 4), wherein the digital detected signals Sd6(x,y) are respectively associated with the detection results of the sensing cells $C_{11}, C_{12}, C_{13}$ of the touch panel 11 at the second time $t_2$.

Step $S_{34}$: The control circuit 175 may calculate a second gain sheet G2 and a second roughness GR2 of the second gain sheet G2 according to the above methods. For example, the control circuit 175 may take a calculation result of at least two gain values within a predetermined range FR around each gain value in the second gain sheet G2 as the second roughness GR2, referring to equation (1) and FIG. 2B. For example, the control circuit 175 may calculate the second gain sheet G2 according to the digital detected signals Sd6(x,y) of the second frame and the setpoint Set, referring to equation (3). Or, the control circuit 175 may calculate the second gain sheet G2 according to the setpoint Set, the first gain sheet G1 and the touch data D6(x,y) of the second frame, referring to equation (4), wherein touch data D6(x,y) is respectively outputted from the subtraction circuit 173 by subtracting a product of each of the digital detected signals Sd6(x,y) in the second frame and an associated gain value G1(x,y) in the first gain sheet G1 from the setpoint Set, referring to FIG. 1. Or, the control circuit 175 may calculate the second gain sheet G2 according to the touch data before and after the change of the drive frequency fdrv as well as the setpoint Set. For example, the subtraction circuit 172 further subtracts a product of each of the digital detected signals Sd5(x,y) in a previous frame of the second frame (e.g. the detection frame at time $t_p$) and an associated gain value G1(x,y) in the first gain sheet G1 from the setpoint Set to respectively output a previous touch data D5(x,y), wherein the previous frame is associated with a first drive frequency fdrv1 and the second frame is associated with a second drive frequency fdrv2. The control circuit 175 then calculates the second gain sheet G2 using the equation (5) according to the previous touch data D5(x,y), the touch data D6(x,y) and the setpoint Set.

Step $S_{35}$: The control circuit 175 then compares the first roughness GR1 and the second roughness GR2. As mentioned above the first roughness GR1 may be calculated in this step.

Step $S_{37}$: When the control circuit 175 identifies that the second roughness GR2 is smaller than the first roughness GR1, the first gain sheet G1 in the gain buffer 171 is replaced by the second gain sheet G2, as the detection frame after the time $t_2$ shown in FIG. 4.

Step $S_{36}$: When the second roughness GR2 is larger than the first roughness, the control circuit 175 may further calculate gain differences of corresponding gain values in the first gain sheet G1 and the second gain sheet G2, e.g. G1(1,1)-G2(1,1), G1(1,2)-G2(1,2)..., and when a count value LSc of the gain differences larger than or equal to a difference threshold THds, referring to equation (2), exceeds (larger than or equal to) a count threshold THc, the first gain sheet G1 in the gain buffer 171 is replaced by the second gain sheet G2. As mentioned above, the Step $S_{36}$ may not be implemented.

In addition, the control circuit 171 identifies whether to update the current gain sheet according to a new detection frame every a predetermined interval.

As mentioned above, the first time $t_1$ and the second time $t_2$ may be separated by a predetermined number of detection frames, and the predetermined number is preferably larger than 2. Between the first time $t_1$ and the second time $t_2$, a processing unit 19 performs the positioning and/or tracking according to the touch data D(x,y) outputted based on the first gain sheet G1. After the second time $t_2$ and within the next predetermined number of detection frames, the processing unit 19 performs the positioning and/or tracking based on the first gain sheet G1 or the second gain sheet G2 according to a comparison result of the first roughness GR1 and the second roughness GR2 at the second time $t_2$.

It should be mentioned that the above embodiments are all based on the roughness of the gain sheet. In other embodiments, it is able to calculate the roughness of the touch data D(x,y) and the roughness of the gain sheet in the embodiments of the present disclosure may be replaced by the roughness of the touch data D(x,y).

As mentioned above, the conventional gain control method has the problem of unable to adapt to environmental change such that errors may occur in operation. Therefore, the present disclosure further provides a capacitive touch system (FIG. 1) and a gain control method thereof (FIG. 3) that may determine whether to update the gain sheet according to the actual received detection results thereby being adaptable to the real-time variation of the operation conditions.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive touch system, comprising:
   a gain buffer configured to store a current gain sheet;
   a multiplying circuit configured to multiply a digital detected signal associated with each sensing cell of a detection frame by an associated gain value in the current gain sheet to respectively output an amplified detected signal;
   a subtraction circuit configured to subtract the amplified detected signal associated with each sensing cell of the detection frame from a setpoint to respectively output a first touch data; and
   a control circuit configured to calculate a first gain sheet associated with the detection frame, a current roughness of the current gain sheet and a first roughness of the first gain sheet, and to replace the current gain sheet in the gain buffer by the first gain sheet when the first roughness is smaller than the current roughness.

2. The capacitive touch system as claimed in claim 1, wherein the current roughness is a calculation result of at least two gain values within a predetermined range around each gain value in the current gain sheet; and the first roughness is a calculation result of at least two gain values within a predetermined range around each gain value in the first gain sheet.

3. The capacitive touch system as claimed in claim 1, wherein the control circuit is further configured to calculate gain differences between corresponding gain values in the current gain sheet and the first gain sheet, and to replace the current gain sheet in the gain buffer by the first gain sheet when a count value of the gain differences larger than a difference threshold exceeds a count threshold.

4. The capacitive touch system as claimed in claim 1, wherein the control circuit calculates the first roughness once every a predetermined number of detection frames, and the predetermined number is larger than 2.

5. The capacitive touch system as claimed in claim 1, wherein the control circuit calculates the first gain sheet according to the digital detected signal and the setpoint.

6. The capacitive touch system as claimed in claim 1, wherein the control circuit calculates the first gain sheet according to the setpoint, the current gain sheet and the first touch data.

7. The capacitive touch system as claimed in claim 1, wherein the multiplying circuit is further configured to multiply a digital detected signal associated with each sensing cell of a previous frame of the detection frame by an associated gain value in the current gain sheet to respectively output an amplified detected signal;
the subtraction circuit is further configured to subtract the amplified detected signal associated with each sensing cell of the previous frame from the setpoint to respectively output a previous touch data;
the previous frame is associated with a first drive frequency and the detection frame is associated with a second drive frequency; and
the control circuit calculates the first gain sheet according to the setpoint, the previous touch data and the first touch data.

8. A gain control method of a capacitive touch system, comprising:
receiving a plurality of digital detected signals of a first frame at a first time;
calculating and storing a first gain sheet associated with the first frame and a first roughness of the first gain sheet;
receiving a plurality of digital detected signals of a second frame at a second time;
calculating a second gain sheet associated with the second frame and a second roughness of the second gain sheet;
comparing, using a control circuit, the first roughness with the second roughness; and
replacing the first gain sheet in a gain buffer by the second gain sheet when the second roughness is smaller than the first roughness.

9. The gain control method as claimed in claim 8, wherein the first roughness is a calculation result of at least two gain values within a predetermined range around each gain value in the first gain sheet; and the second roughness is a calculation result of at least two gain values within a predetermined range around each gain value in the second gain sheet.

10. The gain control method as claimed in claim 8, further comprising:
performing, using a subtraction circuit, a difference between a setpoint and a product of each of the digital detected signals in the second frame and an associated gain value in the first gain sheet to respectively output a touch data.

11. The gain control method as claimed in claim 10, further comprising:
calculating the second gain sheet according to the setpoint, the first gain sheet and the touch data.

12. The gain control method as claimed in claim 10, further comprising:
performing, using the subtraction circuit, a difference between the setpoint and a product of each of the digital detected signals in a previous frame of the second frame and an associated gain value in the first gain sheet to respectively output a previous touch data; and
calculating the second gain sheet according to the setpoint, the touch data and the previous touch data,
wherein the previous frame is associated with a first drive frequency and the second frame is associated with a second drive frequency.

13. The gain control method as claimed in claim 8, wherein the first time and the second time is separated by a predetermined number of detection frames, and the predetermined number is larger than 2.

14. The gain control method as claimed in claim 8, further comprising:
calculating the first gain sheet according to the digital detected signal of the first frame and a setpoint; and
calculating the second gain sheet according to the digital detected signal of the second frame and the setpoint.

15. The gain control method as claimed in claim 8, further comprising:
calculating, using the control circuit, gain differences between corresponding gain values in the first gain sheet and the second gain sheet; and
replacing the first gain sheet in the gain buffer by the second gain sheet when a count value of the gain differences larger than a difference threshold exceeds a count threshold.

16. A capacitive touch system, comprising:
a gain control unit sequentially receiving a plurality of digital detected signals of a detection frame, the gain control unit comprising:
a gain buffer configured to store a current gain sheet; and
a control circuit configured to calculate a first gain sheet according to a setpoint and the digital detected signals of the detection frame, compare a current roughness of the current gain sheet and a first roughness of the first gain sheet and replace the current gain sheet in the gain buffer by the first gain sheet when the first roughness is smaller than the current roughness.

17. The capacitive touch system as claimed in claim 16, wherein the current roughness is a calculation result of at least two gain values within a predetermined range around each gain value in the current gain sheet; and the first roughness is a calculation result of at least two gain values within a predetermined range around each gain value in the first gain sheet.

18. The capacitive touch system as claimed in claim 16, wherein the control circuit is further configured to calculate gain differences between corresponding gain values in the current gain sheet and the first gain sheet, and to replace the current gain sheet in the gain buffer by the first gain sheet when a count value of the gain differences larger than a difference threshold exceeds a count threshold.

19. The capacitive touch system as claimed in claim 16, wherein the control circuit calculates the first roughness once every a predetermined number of detection frames, and the predetermined number is larger than 2.

20. The capacitive touch system as claimed in claim 16, wherein the gain control unit is further configured to perform a difference calculation between the setpoint and a product of each of the digital detected signals in the detection frame and an associated gain value in the current gain sheet.

* * * * *